United States Patent [19]

Citta

[11] Patent Number: 5,103,312
[45] Date of Patent: Apr. 7, 1992

[54] TIME VARIABLE DISPERSIVE FILTER FOR MINIMIZING GHOST INTERFERENCE

[75] Inventor: Richard W. Citta, Oak Park, Ill.

[73] Assignee: Zenith Electronics Corporation, Glenview, Ill.

[21] Appl. No.: 458,929

[22] Filed: Dec. 29, 1989

[51] Int. Cl.[5] .................... H04N 5/38; H04N 5/213
[52] U.S. Cl. .................... 358/167; 358/905; 358/187
[58] Field of Search ............. 358/167, 36, 905, 186, 358/187

[56] References Cited

U.S. PATENT DOCUMENTS

| | | | |
|---|---|---|---|
| 4,300,161 | 11/1981 | Haskell | 358/142 |
| 4,434,440 | 2/1984 | Schiff | 358/186 |
| 4,502,077 | 2/1985 | Morotomi et al. | 358/905 |
| 4,684,989 | 8/1987 | Roeder et al. | 358/36 |
| 4,896,213 | 1/1990 | Kobo et al. | 358/167 |
| 4,951,146 | 8/1990 | Citta | 358/195.1 |

Primary Examiner—Victor R. Kostak
Assistant Examiner—Jeffrey S. Murrell

[57] ABSTRACT

A video signal transmission system includes a dispersal filter having a variable dispersal characteristic for time dispersing a video signal. The filter is supplied with dispersal coefficients from a ROM for continually varying its dispersal characteristic over each line of the video signal. The low frequency content of the video signal is removed and the resultant high frequency video signal is applied to the dispersal filter. The variably dispersed video signal is combined with data, including a coded representation of the low frequency portion and transmitted. A receiver receives the dispersed signal, removes the data and applies the dispersed signal to an inverse dispersal filter that is supplied with dispersal coefficients from a ROM for providing a complementary (inverse) time dispersal function for recovering the high frequency video signal. The data is decoded and the low frequency portion reconstituted and combined with the high frequency video signal. Ghost signals that are delayed in transmission are subjected to an inverse dispersal function that is not complementary to the function with which the signal was processed at the transmitter and are therefore further dispersed.

8 Claims, 3 Drawing Sheets

TIME VARIABLE DISPERSIVE FILTER FOR MINIMIZING GHOST INTERFERENCE

CROSS REFERENCE TO RELATED APPLICATIONS

This application is related to, but not dependent upon: copending applications serial No. 238,956, filed Aug. 31, 1988, abandoned in favor of continuation application Ser. No. 566,784, filed Aug. 13, 1990 entitled TV Signal Transmission Systems And Methods; serial No. 266,740, filed Nov. 3, 1988, entitled Clock Signal Communication System; and serial No. 298,081, now U.S. Pat. No. 4,951,146 filed Jan. 17, 1989, entitled Directionally Controlled Dispersive Filtering For Reducing Co-Channel Interference; all of which are assigned to Zenith Electronics Corporation the Assignee of this application and all of which are incorporated by reference herein.

BACKGROUND OF THE INVENTION AND PRIOR ART

Broadcast radio frequency signals, such as television signals, travel through the air at great speed. The delay between the time a broadcast signal leaves a transmitter and arrives at a receiver is referred to as a propagation delay. Broadcast signals are also reflected by solid surfaces in much the same way that light is reflected. These reflections create multipath distortion or "ghosting". There is a direct or main path between a transmitter and a receiver which is characterized by a given propagation delay and one or more indirect paths, consisting of reflected signals, that have proportionately longer propagation delays. The receiver therefore receives two or more nearly identical signals (the ghost is weaker) that are displaced in time. Ghost signals generally detract significantly from the video display.

A solution to multipath television signals, by way of ghost cancellation or ghost minimization has long been a challenge to the television industry. The cancellation systems that have been proposed typically involve the use of adaptive equalizers that generate a signal from the main signal which can be used to cancel the ghost. Adaptive equalizers require a large number of real multipliers (between 250 and 500) to provide adequate ghost reduction performance in the receiver. At this level of complexity, the cost of ghost signal reducing equipment is prohibitive. Another recently proposed system samples the video signal and the sample is then pseudo-randomly scrambled for transmission. An inverse scrambling operation is performed in the receiver. While this can theoretically yield an increase in ghost performance, the system is quite sensitive to inter symbol interference which produces pseudo random noise that is added to the main image.

The system of the invention utilizes a time dispersal filter that has a variable dispersion factor or coefficient which may be changed to vary the degree of time dispersion of the input signal. In its preferred implementation, the system of the invention utilizes a "hybrid" video signal that has been processed in accordance with copending application Ser. No. 238,956 to remove low frequencies, generally under 200 KHz, which are digitally coded and transmitted as data in the vertical blanking interval of the signal. Thus the processed video signal consists primarily of "edges" with "voids" in the frequency spectrum due to low frequency component removal.

In application Ser. No. 266,740 a technique for time dispersing a timing or clock signal to minimize ghosting and noise in that clock signal is disclosed. The clock signal is processed by a dispersal filter in the transmitter and reconstituted by complementary processing in a dispersal filter of opposite characteristic, i.e. an inverse dispersal filter, in the receiver. Any ghost of the signal is not so processed in the transmitter and is dispersed by the inverse dispersal filter in the receiver. In application Ser. No. 298,081, a signal is processed by a dispersal filter of one sense and the receiver is provided with a dispersal filter that can have its sense changed by operation of a suitable switch. The receiver responds to the transmitted signal and establishes the sense of its dispersal filter to complement that of the transmitter filter. Consequently it is able to receive the transmitted signal. The arrangement is useful for minimizing co-channel interference.

In the system of the invention, the dispersal filter has a variable dispersal characteristic that is varied on a regular basis in response to an algorithm (or reading of a ROM). A dispersal filter in the receiver has its dispersal characteristic varied in a complementary fashion to develop the original signal. The time dispersal characteristic is continually being varied, and multipath signals will be "out-of-step" when processed by the receiver dispersal filter. The result is that multipath or ghost signals are further dispersed in the receiver. Only the main image signal will be reconstituted. The further dispersal of ghost signals will reduce their visual effect to background noise, which is far less objectionable to a viewer than one or more ghost signal images.

OBJECTS OF THE INVENTION

A principal object of the invention is to provide an improved video signal transmission system.

Another object of the invention is to provide a video signal transmission system that minimizes multipath or ghost signal distortion.

A feature of the invention resides in the provision of a variable time dispersal filter that encodes the video signal for transmission and a complementary inverse variable time filter that decodes the signal at a receiver.

Another feature of the invention resides in the provision of a ROM for storing a multiplicity of dispersal coefficients for changing the time dispersal characteristics of the variable dispersal filter in sequence as the ROM is read.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
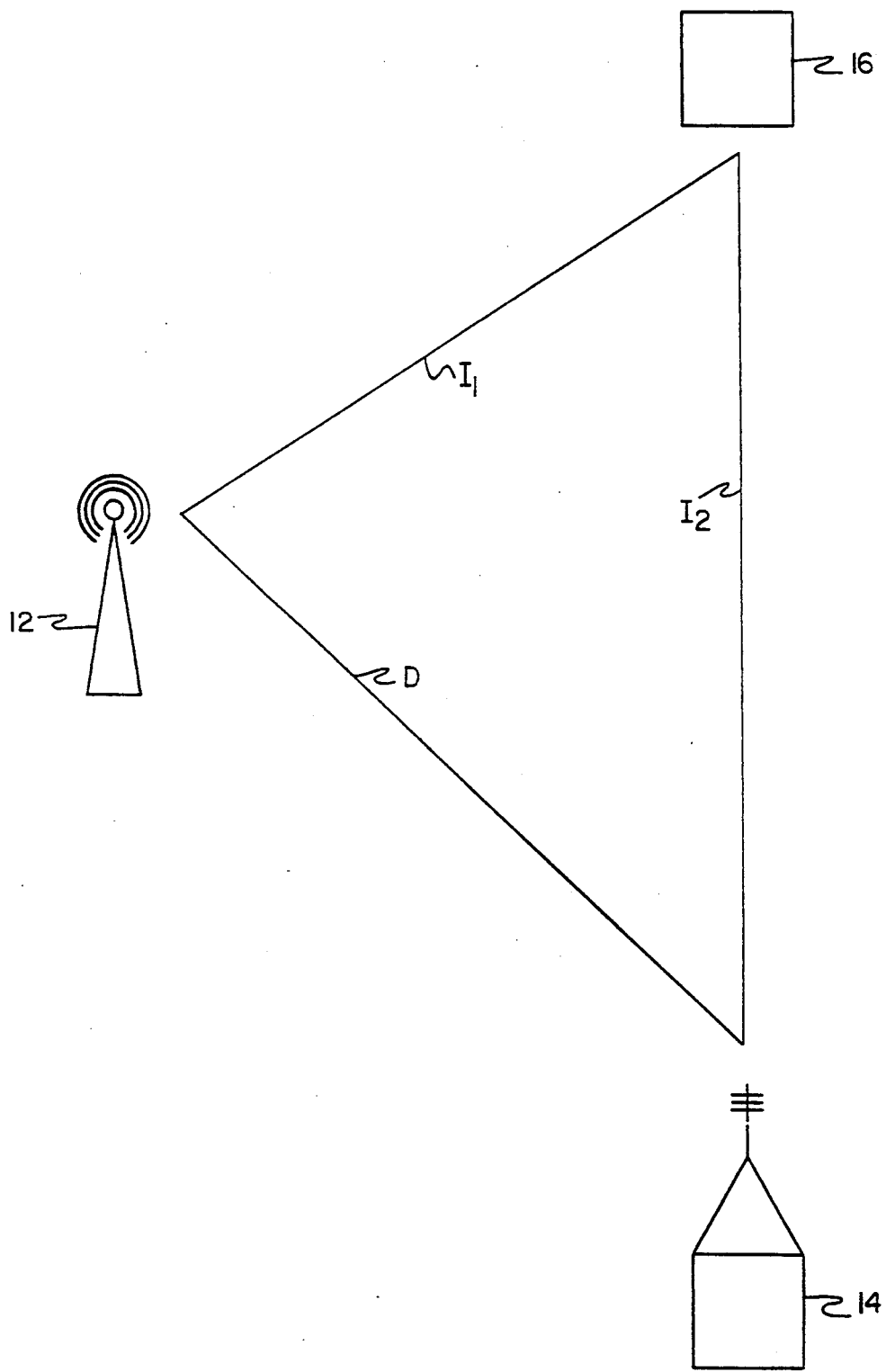
FIG. 1 is a simplified pictorial representation of a transmission system having multipath distortion.

Referring to FIG. 1, a transmitter 12 broadcasts a television signal to a receiver 14 along a direct path indicated by the letter D. An indirect path for the signal also exists from transmitter 12. The signal is reflected by a large building 16, for example, and the indirect path consists of path segments I1 and I2. The direct path D obviously has a shorter propagation time than the indirect path segments I1 and I2. Receiver 14 will therefore receive a direct signal followed by a ghost signal a few micro-seconds later. The ghost signal appears on the video display (not shown) as a weaker image that is horizontally displaced from the main image. The amount of the displacement is a function of the propagation delay. Typically the propagation delay between the main and ghost images is in the range of 2 to 10 microseconds.

According to the present invention, the multipath or ghost performance of a television signal transmission system is improved through the use of variable time dispersal filters. At the transmitter a video signal is processed by a dispersal filter whose transfer function is varied at a rate that is substantially greater than the horizontal periodicity of the video signal. At the receiver the received signal is processed by a complementary inverse dispersal filter having a transfer function that is varied at a corresponding rate. The main image in the receiver is decoded by the inverse transfer function that corresponds to, i.e. is complementary to, the encoding transfer function in the transmitter. The ghost image, however is processed by a noncorresponding inverse transfer function since it is received later than the main image and at a time when the transfer characteristic of the receiver inverse dispersal filter is different from that which was experienced by the main image at the transmitter. The result is that the ghost signal energy is further dispersed and its visibility on the video display is greatly reduced.

Figure 2:
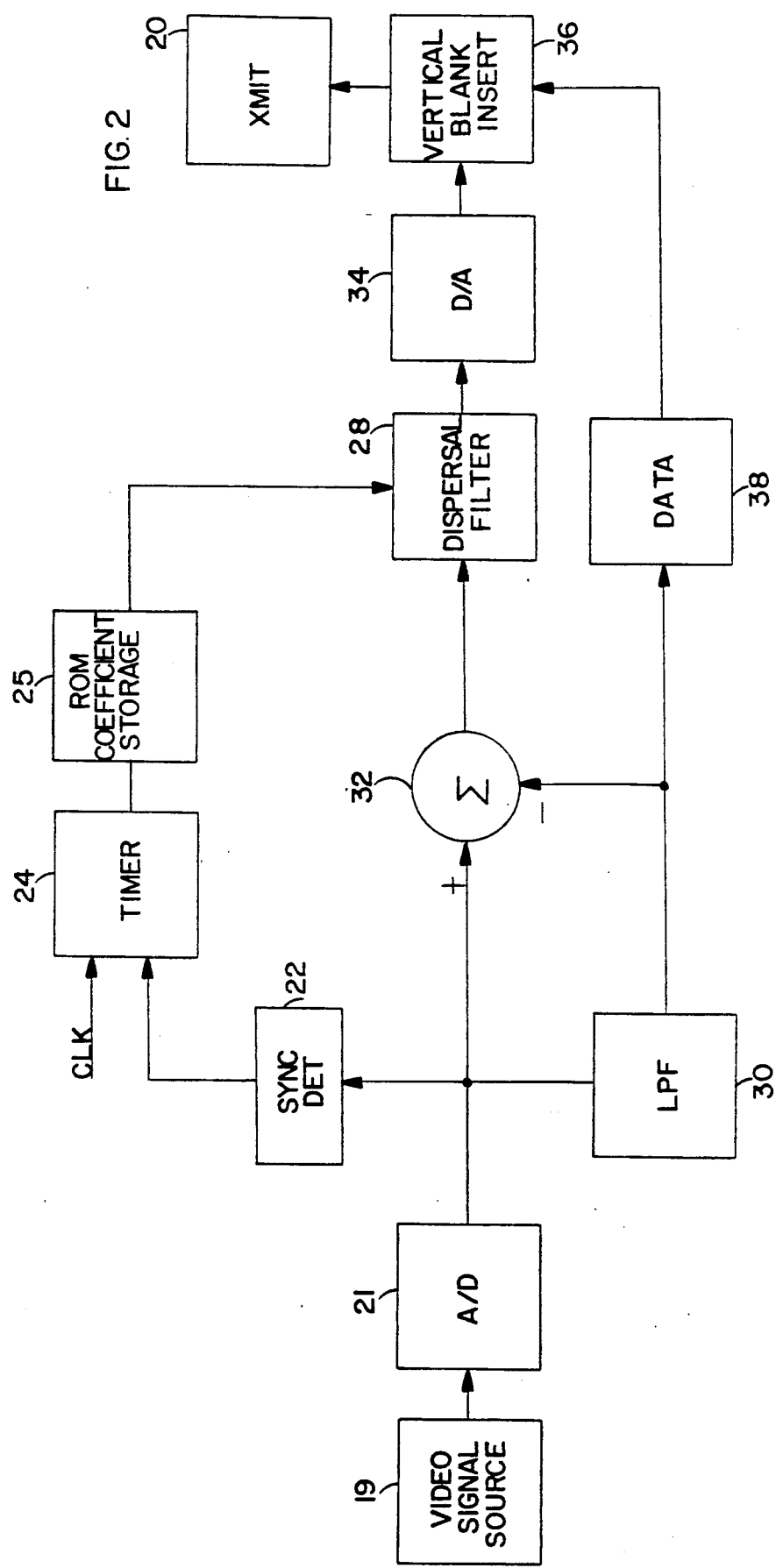
FIG. 2 is a partial block diagram of a television signal transmitter constructed in accordance with the invention.

In FIG. 2, a transmitter 20 is supplied with a processed video signal from a processor 18. A video signal source 19 is coupled to an analog to digital (A/D) converter 21 which converts the input video signal to a digital video signal. The sample rate of the A/D converter is preferably around 5.6 MHz. The digital video signal is applied to a sync detector 22 and to a low pass filter 30. Sync detector 22 couples each horizontal sync pulse in the digital video signal to a reset input of a timer 24. Timer 24 provides an output signal for addressing (and reading the contents of) a memory 26 labelled coefficient storage. Memory 26 is preferably a ROM that includes a plurality of filter coefficients. The coefficients from memory 26 are read out and applied as control signals to a dispersal filter 28 for controlling its time dispersal characteristics. The digital video signal is also supplied to one input of a summation circuit 32 which is also supplied with the negative output of low pass filter 30. Therefore the output of low pass filter 30 is subtracted from the digital video signal, forming a high frequency video signal as described in application Ser. No. 236,956. The high frequency video signal is characterized by many "edges" and relatively large energy voids over the frequency spectrum. The output of summer 32 is applied to the dispersal filter and the high frequency video signal is time dispersed in accordance with the transfer function of dispersal filter 28. The dispersed signal is applied to a D/A converter 34 and to a vertical blanking signal inserter 36. The low pass filter output 30 is applied to a data unit 38 where data concerning the removed low frequency signal is developed and encoded and inserted in the vertical blanking interval of the television signal. This occurs in vertical blanking inserter 36. The video output signal from vertical blanking signal inserter 36 is supplied to transmitter 20.

The coefficients stored in memory 26 may each be represented by 8 to 10 bit digital words. There may be approximately 250 to 1000 different coefficient sets for each horizontal line of video of approximately 1000 pixels. The coefficients are selected to provide changes in the dispersive characteristics of dispersal filter 28 but to maintain a fairly smooth transition in the filter's group delay to allow accurate reconstruction of the dispersed signals at the receiver. Abrupt changes in group delay would cause distortion in the recovered or reconstructed signal. The clock signal applied to the timer 24 is selected such that the address signals produced by the timer increments, (and thus reads) all of the dispersal coefficients in memory 26 in each horizontal line of video. The large number of coefficients represents the preferred implementation. It is recognized that a cost reduction can be effected by using a smaller number of coefficients. However care must be exercised to assure that the difference in propagation delay between the direct and indirect or reflected signals is not the same as the repetition rate of the coefficients.

Figure 3:
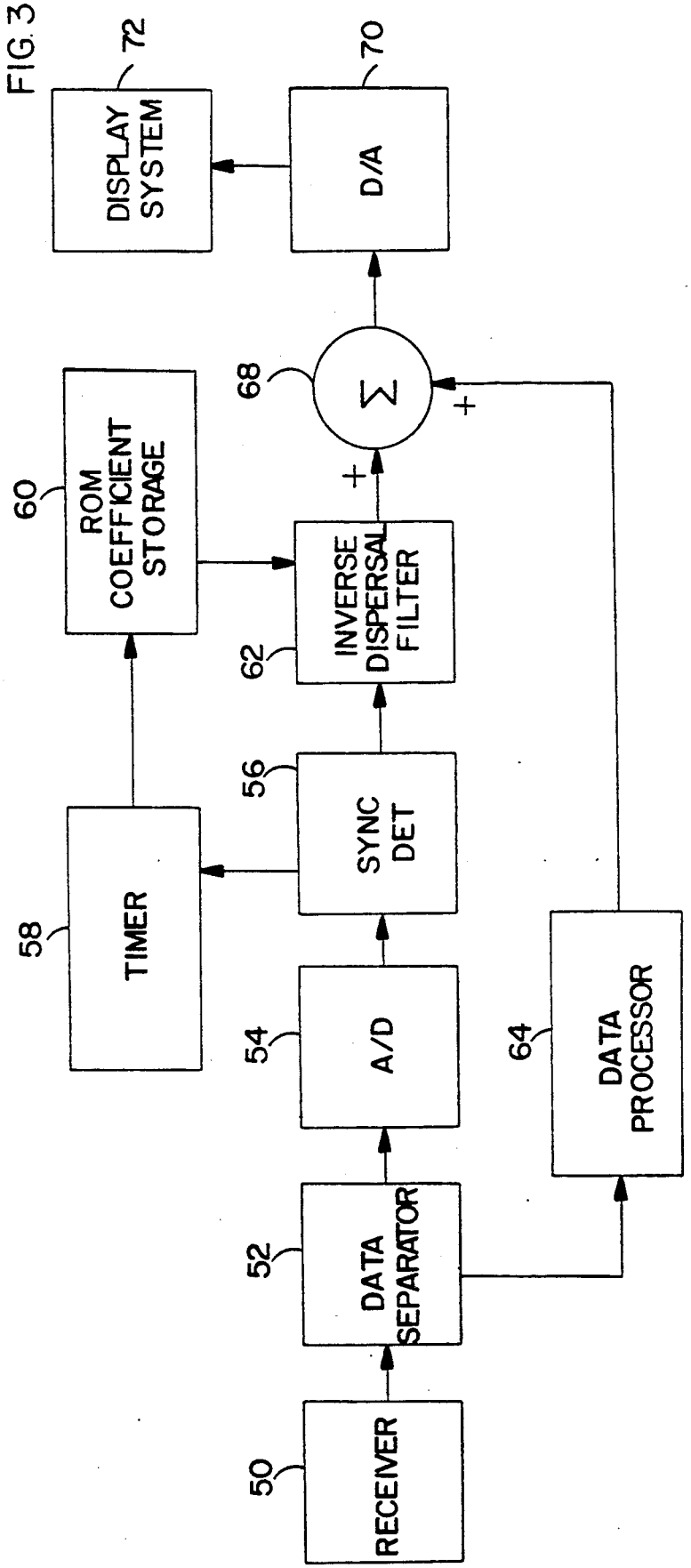
FIG. 3 is a corresponding partial block diagram of a television receiver constructed in accordance with the invention.

In FIG. 3, a receiver 50 receives the transmitted signal. Data is separated in a data separater 52, with data going to a data processor 64 and the signal to an A/D converter 54, the output of which is provided to a sync detector 56. Sync detector 56 controls a timer 58 that in turn addresses a memory 60 (preferably a ROM) providing coefficient storage with the coefficients being such that when applied to an inverse dispersal filter 62, a transfer characteristic complementary to that in the transmitter is achieved. Complementary means that the transfer function of inverse dispersal filter 62 is precisely the opposite of that of dispersal filter 28 in FIG. 2 (for the same portion of the signal). This assures proper reconstitution of the variably time dispersed signal (and the further dispersal of delayed signals). The output of sync detector 56 is applied to inverse dispersal filter 52 as is the output of memory 60. The inverse dispersal filter produces a signal corresponding to the high frequency video signal which is applied to a summer 68 along with the output of data processor 64 which reproduces the low frequency portion of the signal (in digital form). The output of summer 68 is the reconstituted video signal and is applied to a D/A converter 70 and to a display system 72.

As discussed above, the inverse dispersal filter in the receiver is coordinated in its operation with the dispersal filter in the transmitter by the timing circuits and the ROM storage of dispersal coefficients that are applied in the same sequence and with the same timing to the dispersal filter and inverse dispersal filter, respectively. At any given time therefore, the received signal is subjected to an inverse time dispersal transfer function complementary to that experienced in the transmitter. The delayed signal, or ghost signal, arrives later and at a time when the inverse dispersal filter characteristic does not complement that experienced by the main signal (from which the ghost signal derives) in the transmitter. Consequently, the delayed or ghost signal is further dispersed by inverse dispersal filter 62 and appears as a noise background signal which is much less visible (and annoying) to a viewer than a ghost signal.

It is recognized that numerous changes and modifications in the described invention will readily occur to those skilled in the art without departing from its true spirit. The invention is to be limited only as defined in the claims.

What is claimed is:

1. A video signal transmission system comprising:
   dispersal filter means having a variable time dispersion characteristic;
   means for applying a video signal to said dispersal filter means to develop a time dispersed video signal;
   means for generating a sequence of control signals for varying said time dispersion characteristic of said dispersal filter means; and
   means for transmitting said time dispersed video signal.

2. The system of claim 1 wherein said control signal generating means comprises a ROM for storing a plurality of time dispersal coefficients; and
   timing means for accessing said ROM to develop said sequence of control signals from said time dispersal coefficients.

3. The system of claim 2 wherein said video signal is formatted with successive horizontal lines and wherein said timing means accesses said ROM to read all of said timing dispersal coefficients for each of said horizontal lines of said video signal.

4. A receiver for receiving a time dispersed video signal processed by first filter means having a time dispersion characteristic that changes in response to a sequence of first control signals comprising:
   means for receiving and supplying said time dispersed video signal to a second filter means having an inverse time dispersion characteristic; and
   means for applying to said second filter means a sequence of second control signals for changing the inverse time dispersion characteristic thereof for complementary processing of said time dispersed video signal and recovery of said video signal.

5. The receiver of claim 4 wherein said first control signals are generated in a sequence by accessing first time dispersal coefficients stored in a first ROM and further including:
   a second ROM for storing second time dispersal coefficients for generating said second control signals to vary said time dispersion characteristic of said second filter means in a complementary manner; and
   timing means for accessing said second ROM and developing said second control signals from said second timing coefficients.

6. The receiver of claim 5 wherein said video signal is formatted with successive horizontal lines and wherein said timing means accesses said second ROM to read all of said second timing coefficients for each horizontal line of said video signal.

7. A method of transmitting and receiving a video signal having a horizontal periodicity comprising the steps of:
   time dispersing a video signal according to a predetermined dispersal function that varies at a rate greater than the horizontal periodicity of said video signal;
   transmitting said time dispersed video signal;
   receiving said transmitted signal; and
   time dispersing said received signal according to a dispersal function that complements said predetermined dispersal function.

8. A method of transmitting and receiving a television video image signal to reduce the visibility of ghosts in a reproduced image of said television video image signal comprising the steps of:
   processing a portion of the video image signal according to a first dispersal filter transfer function to develop a processed video image signal;
   transmitting the processed video image signal over a channel which introduces an associated ghost signal;
   receiving the transmitted video image signal and its associated ghost signal;
   processing the received video image signal according to a second dispersal filter transfer function comprising the inverse of said first transfer function; and
   processing said received ghost signal according to a third dispersal filter transfer function different from said second transfer function.

* * * * *